United States Patent [19]

Livesay

[11] 4,277,876
[45] Jul. 14, 1981

[54] METHOD FOR ROTATING A TRACK CHAIN BUSHING

[75] Inventor: Richard E. Livesay, Peoria, Ill.

[73] Assignee: Caterpillar Tractor Co., Peoria, Ill.

[21] Appl. No.: 75,929

[22] Filed: Sep. 17, 1979

Related U.S. Application Data

[62] Division of Ser. No. 916,974, Jun. 19, 1978, Pat. No. 4,187,744.

[51] Int. Cl.³ .................... B23P 7/00; B21D 53/10
[52] U.S. Cl. ..................... 29/402.01; 29/149.5 R; 29/149.5 C; 308/237 A
[58] Field of Search ............. 29/402.01, 149.5 R, 29/149.5 C, 401.01; 308/237 R, 237 A

[56] References Cited

U.S. PATENT DOCUMENTS

| | | | |
|---|---|---|---|
| 3,915,036 | 10/1975 | Vanlandingham et al. | 81/3 R |
| 4,002,090 | 1/1977 | Vanlandingham et al. | 29/401 R |
| 4,050,141 | 9/1977 | Vanlandingham et al. | 29/401 R |
| 4,129,045 | 12/1978 | Kishitani | 308/237 R |

Primary Examiner—Nicholas P. Godici
Assistant Examiner—V. K. Rising
Attorney, Agent, or Firm—Kenneth A. Rhodes

[57] ABSTRACT

It is recommended practice to turn each bushing in a track chain of a track-type vehicle which is composed of interconnected bushings and links after a measured amount of wear has occurred to expose different wear surfaces and extend the useful life of the track chain. Heretofore, such turning of the bushing required time consuming disassembly and reassembly of the track chain or the use of inefficient tools. A method and apparatus are provided for rotating the bushing and exposing a new wear surface. The method includes torquing the bushing (14) and impacting the link (12) to turn the bushing (14). The apparatus includes a clamp (24) which engages and torques the bushing (14) and an impactor (36, 38) for impacting the link (12) until the bushing (14) rotates relative to the link (12).

3 Claims, 3 Drawing Figures

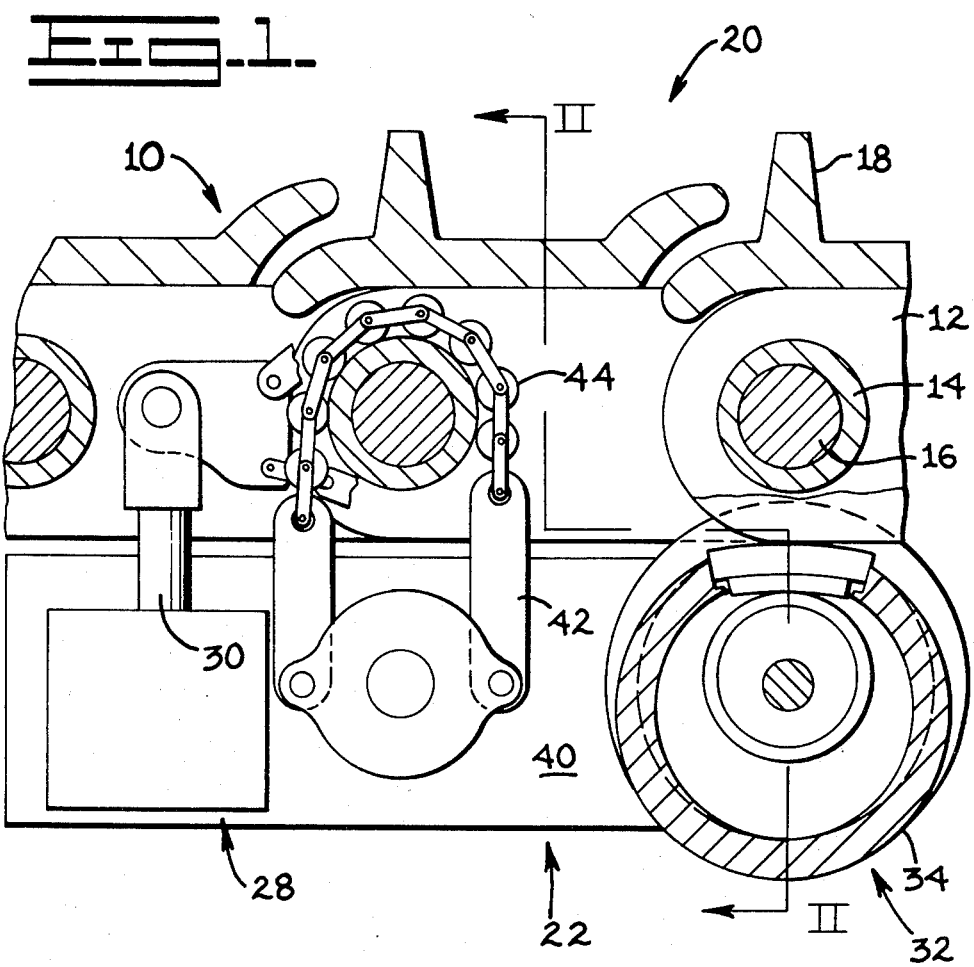

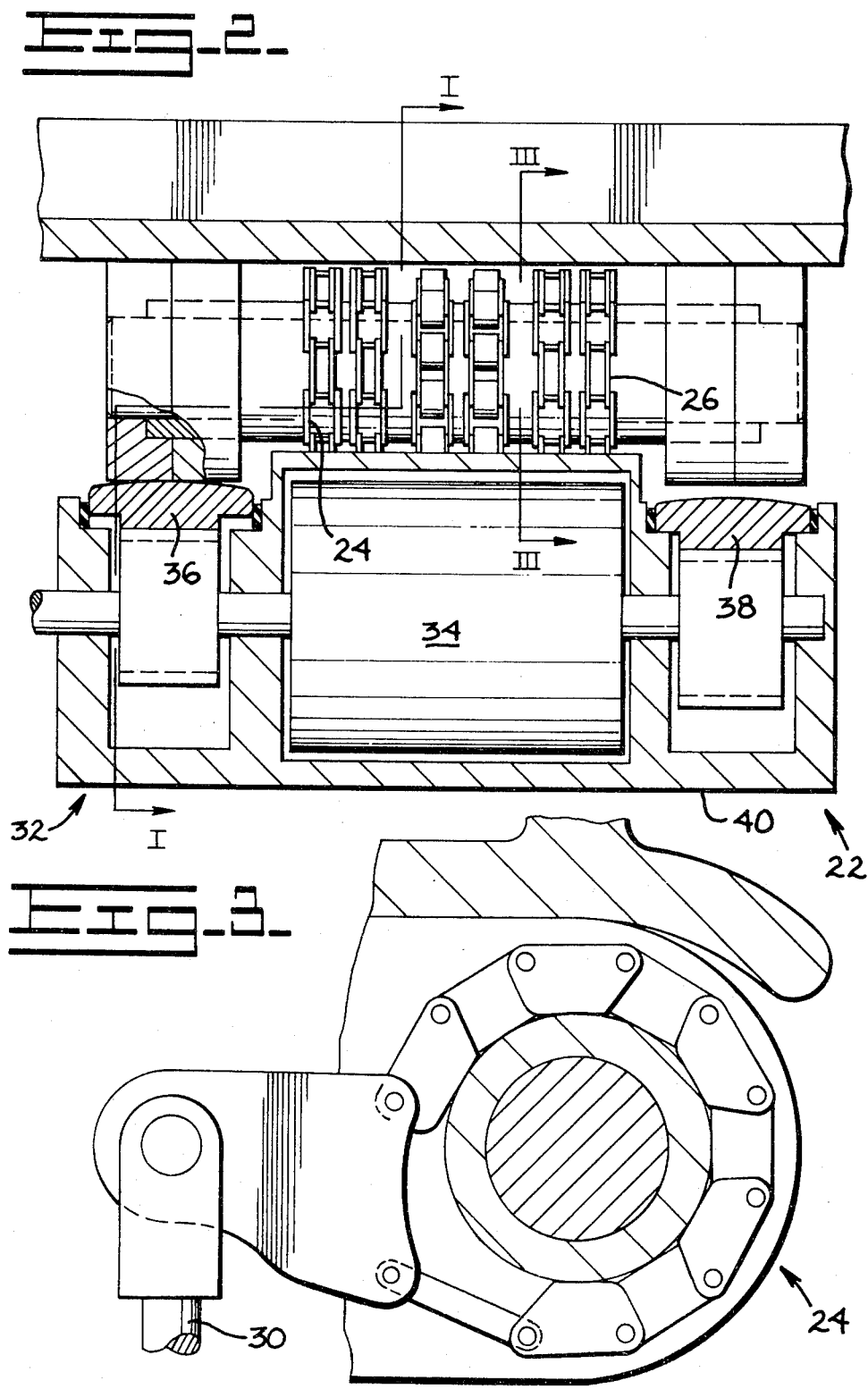

METHOD FOR ROTATING A TRACK CHAIN BUSHING

This is a division of Ser. No. 916,974, filed June 19, 1978 and now U.S. Pat. No. 4,187,744 issued Feb. 12, 1980.

TECHNICAL FIELD

This invention relates to endless track chains and more particularly to methods and apparatus for turning the track chain bushings with the track fully assembled.

BACKGROUND ART

Commonly used track chains for earthmoving vehicles comprise a plurality of track links. The track links are connected into two parallel endless chains by means of track link hinge joints having track pins joining the ends of adjacent pairs of links and spanning the space between the parallel chains. Drive sprockets drive the track chains and provide locomotion for the vehicle by acting against bushings upon the track pins.

For efficient and low cost operation, it is, of course, desirable to construct a track chain in a manner to provide for long, trouble-free operating life. All track parts are subject to wear because of the service they perform and the abrasive environment in which they operate. Recent developments in seals and lubrication methods promise to increase the life of some track parts measurably and it appears that the track bushing in its present form may well continue to be one of the first elements of the track to require repair or replacement.

Force for driving the tracks by sprocket is received upon a given portion of the bushing. Additionally, as each such bushing comes into engagement with or tends to be disengaged from the sprocket, the same portion of the bushing always contacts the sprocket. Since the bushing is conventionally pressed into the inner pair of links, it does not rotate while in engagement with the sprocket. There is, however, limited motion between the bushing and sprocket during engagement and disengagement of the sprocket with the bushing. The motion of the bushing against the sprocket is commonly referred to as "scrubbing" and causes substantial abrasion of the portion of the bushing which contacts the sprocket.

Prior art efforts to provide long life bushings have been directed at compensating for such abrasion of the bushings. For example, it has been recommended practice to reverse or turn each bushing after a measured amount of wear, so that such wear occurs on different portions of the bushing surface.

Heretofore, such reversing or turning of the bushing required time consuming disassembly and reassembly of the track chain, which is, of course, undesirable. It is desirable to be able to rotate the bushings to present another wear surface thereof to the sprocket with the track chains completely assembled and in place on the vehicle.

Examples of methods and apparatus for turning bushings are disclosed in U.S. Pat. No. 3,915,036 granted Oct. 28, 1975; U.S. Pat. No. 4,002,090 granted Jan. 11, 1977 which is a division of U.S. Pat. No. 3,915,036; and U.S. Pat. No. 4,050,141 granted Sept. 27, 1977 which is a continuation of abandoned U.S. Application Ser. No. 617,346 filed Sept. 29, 1975 which was a division of U.S. Pat. No. 3,915,036, all of which had Harold W. Vanlandingham, Roger L. Boggs, David A. Bullock, and James N. Maytum as common joint inventors.

In U.S. Pat. No. 3,915,036 a clamp member is connected to the bushing and a hydraulic cylinder is connected to the clamp member to apply the force required to turn the bushing. The clamp member has two parts adapted to encircle a bushing of a preselected size. The two parts are placed on the bushing and bolted together and a third part is moved by screws into engagement with the worn portion of the bushing, which is time consuming and inefficient. While the apparatus effectively turns the bushing either a very high pressure pump or a large cylinder must be used.

On a track suitable for use with a D9 track-type tractor manufactured by Caterpillar Tractor Co., the links are pressed onto the bushings with an interference about 0.2 mm (0.008 inch). When the apparatus of U.S. Pat. No. 3,915,036 is employed to turn these bushings, the cylinder has about a 200 mm (8.0 inch) diameter and uses a pump which delivers about 69,000 kPa (10,000 psi) as compared to the 35,000 kPa (5,000 psi) or less normally used in the vehicle hydraulic systems. Such high pressure can mobilize nuts, bolts or other machine parts, tools or equipment and cause injury if a leak developed. Using a lower output pump would require an even larger cylinder which would require partial or total disassembly of the track. It is desirable to have a compact bushing turning tool which does not require higher than normal fluid pressures.

A solution to the high fluid pressure problem is disclosed in U.S. Pat. No. 4,002,090 where an elongated arm member is connected to the clamp member. The extended end of the arm is positioned to be contacted by a body which is fixed relative to the vehicle, upon forward motion of the vehicle. Thus, the forward driving force of the vehicle is utilized to the bushing. While high fluid pressure is not required, the bushings are turned while the vehicle is in motion which is itself undesirable since it means mobilizing a mass of about 35,000 kg (76,000 lb.). It is desirable to rotate the bushings of a completely assembled track without mobilizing the entire vehicle.

A method for turning bushings is described in U.S. Pat. No. 4,050,141 using the apparatus of U.S. Pat. Nos. 3,915,036 and 4,002,090 and similar apparatus. This method has the advantages of the apparatus used to perform the method and, unfortunately, the disadvantages also. Thus, the method employs a high pressure pump, a large cylinder or a moving track chain or it requires at least partial disassembly of the track. It is therefore desirable to have a bushing turning method which is simple to perform on a stationary, fully assembled track without the use of high fluid pressure or large cylinders.

DISCLOSURE OF INVENTION

In one aspect of the present invention an apparatus is provided for controllably rotating a first cylindrical member relative to a second member connected thereto. The apparatus includes a clamp for engaging the cylindrical member and apparatus for applying a turning force to the clamp and torquing the first member. The apparatus also includes apparatus for successively impacting the second member. In another aspect of the present invention a method for rotating a cylindrical member relative to a connected member is provided by applying a rotative force to the cylindrical member and impacting the connected member.

The present invention solves the problem of efficiently and effectively turning a cylindrical track bushing relative to a connected track chain link by torquing the bushing and impacting the link, eliminating the need for large cylinders on high pressure pumps. By impacting the links the bushing torque required to turn the bushing is reduced so that small cylinders and low pressure pumps can be used. The bushings are turned with the track fully assembled and stationary.

BRIEF DESCRIPTION OF THE DRAWINGS

FIG. 1 is a diagrammatic longitudinal sectional view taken along line I—I of FIG. 2;

FIG. 2 is a diagrammatic transverse sectional view taken along line II—II of FIG. 1; and FIG. 3 is a partial diagrammatic longitudinal sectional view taken along line III—III of FIG. 2.

BEST MODE FOR CARRYING OUT THE INVENTION

Referring to FIG. 1, a conventional track-type vehicle track 10 is composed of a series of interconnected links 12, bushings 14, bushing pins 16 and shoes 18 which interact to propel the track-type vehicle 20 in a well known manner.

Referring to FIGS. 1-3, an apparatus 22 controllably rotates a first cylindrical member, such as the bushing 14, relative to a second connected member, such as the link 12. The apparatus 22 includes a clamp 24 which has a construction sufficient for circumferentially engaging the bushing 14 with a force sufficient for preventing relative motion between the clamp 24 and bushing 14. The clamp 24 is preferably a chain type clamp. The apparatus 22 also includes a second clamp 26. The chains 24,26 are positioned between the links 12 about opposed end portions of the bushing 14 in the installed position. The chains 24,26 are preferably tungsten carbide faced pipe wrench chains.

A first means 28 is provided for applying a turning force to each of the clamps 24,26 and torquing the bushing 14 a preselected amount in a first direction. The first means 28 includes motor means, such as a hydraulic cylinder 30 connected to the clamp 24 for applying the turning force to the clamp 24. By this construction, the clamp 24 is merely placed about the bushing 14 and the motor means 30 tightens the clamp 24 and torques the bushing 14.

The fluid motor 30 preferably has about a 25 mm (1 in.) stroke, maximum diametrical dimension of about 100 mm (4.0 in.) and preferably receives fluid pressurized to about 290 Kpa (2000 psi). The diameter and operating pressure of the cylinder 30 will, of course, depend upon the specific use for which it is employed, but for turning track bushings 14, the diameter need not exceed 100 mm and the pressure need not exceed 725 kPa.

The apparatus 22 also includes second means 32 for successively impacting the link 12. The second means 32 preferably includes an eccentric crankshaft motor 34 of the type described in U.S. Pat. No. 3,770,322 granted on Nov. 6, 1973 to Delwin E. Cobb, Carl L. Kepner, Wayne E. Roberts and Albert L. Woody; and U.S. Pat. No. 3,868,145 granted Feb. 25, 1975 to Delwin E. Cobb, Jerry D. Fidler, Nathan Gutman, Richard E. Livesay, and Orrin A. Stemler.

The motor 34 has first and second impactors 36,38 each having a "T" shaped cross section. The impactors 36,38 are a size sufficient for impacting a selected area of an associated link 12. The impactors 36,38 are 180° out of phase and successively deliver alternating impact blows to the links 12, preferably at a rate of 1000 impacts per minute per link. The motor 34 is preferably driven by a pump which develops a fluid pressure of about 13,780 kPa (2000 psi) so that the impactors 36,38 impact each link 12 with a maximum force of about 3375 N (15,000 lbf).

A housing 40 encloses the eccentric crankshaft motor 34 and first means 28. A third means, such as a support chain 42 maintains the apparatus 22 at a preselected position relative to the links 12 and bushing 14. The support chain 42 has a length sufficient for being entrained about the bushing 14. The chain 42 has rollers 44 which circumferentially engage the surface of the bushing 14. The rollers 44 allow the bushing 14 to rotate within the support chain 42. By this construction, the impactors 36,38 are maintained at the proper position for impacting the links 12.

INDUSTRIAL APPLICABILITY

In one aspect of the present invention the bushings 14 of the track 10 are turned in place on the vehicle 20 with the track 10 fully assembled. The apparatus 22, which has a mass of only about 113 Kg (250 pounds), is positioned on the underside of the track 10 and secured in place with the support chain 42. The clamps 24,26 are then entrained about the bushing 14. As the cylinder 30 is extended the clamps 24,26 dig into the bushing 14 firmly gripping the bushing.

Extending the cylinder 30 further torques the bushing 14 and preloads the impactors 36,38 to develop peak impact force. After the maximum stroke is reached the shaft retracts, slacking off the clamping force, and applies force for continued turning of the bushing 14.

The support chain 42 reacts the force output of the fluid motor 30 and eccentric motor static force and supports the entire apparatus when the fluid motor 30 is ratcheting the chain 24.

The bushing 14 is rotated by impacting the links 12 and applying a rotative force to the links 12 which is opposite in direction to the rotative force applied to the bushing 14 connected to the links 12. The links 12 which are connected to one end of the bushing 14 are impacted, then the links 12 connected to the other end are impacted in an alternating manner thereby alternately pushing and pulling the link 12.

Thus, the bushing 14 is rotated relative to the connected link 12 with the track 10 fully assembled and without the use of excessive fluid pressures. The bushing turning apparatus 22 is compact and comparatively easy to operate.

Other aspects, objects and advantages of this invention can be obtained from a study of the drawings, the disclosure and the appended claims.

What is claimed is:

1. In a method for rotating a bushing (14) of an assembled and in place track (10) of a track-type vehicle (20) to expose a new wear surface, said track (10) having interconnected links (12) fitted on opposed ends of the bushing (14), said method including applying a rotative force to the bushing (14), the improvement comprising:
    impacting the links (12) and applying a rotative force to the links (12) opposite in direction to the rotative force applied to the bushing (14) connected to the links (12).

2. A method, as set forth in claim 1, including impacting the links (12) connected to one end of the bushing (14), and impacting the links (12) connected to the other end of the bushing (14) in an alternating manner.

3. A method for rotating a cylindrical member (14) relative to a connected member (12), comprising:
- connecting a clamp (24) to the cylindrical member (14);
- applying a force to the clamp (24) and applying a rotative force to the cylindrical member (14); and
- impacting the connected member (12).

* * * * *